(12) United States Patent
Schmierer et al.

(10) Patent No.: US 12,263,792 B2
(45) Date of Patent: Apr. 1, 2025

(54) EXTERIOR INSTALLED CAMERA POD STABILIZATION ASSEMBLY

(71) Applicant: Motherson Innovations Company Limited, London (GB)

(72) Inventors: Arne Schmierer, Stuttgart (DE); Volker Erhart, Stuttgart (DE); Csaba Szilágyi, Stuttgart (DE); Hans-Dieter Pomparew, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 124 days.

(21) Appl. No.: 18/004,730

(22) PCT Filed: Aug. 16, 2021

(86) PCT No.: PCT/EP2021/072711
§ 371 (c)(1),
(2) Date: Jan. 9, 2023

(87) PCT Pub. No.: WO2022/034238
PCT Pub. Date: Feb. 17, 2022

(65) Prior Publication Data
US 2023/0303007 A1    Sep. 28, 2023

Related U.S. Application Data

(60) Provisional application No. 63/065,596, filed on Aug. 14, 2020.

(51) Int. Cl.
*B60R 11/04* (2006.01)
*B60R 1/06* (2006.01)
(Continued)

(52) U.S. Cl.
CPC ............ *B60R 11/04* (2013.01); *B60R 1/0617* (2013.01); *F16M 11/2014* (2013.01);
(Continued)

(58) Field of Classification Search
None
See application file for complete search history.

(56) References Cited

U.S. PATENT DOCUMENTS

2018/0265015 A1* 9/2018 Rohrmüller ........... B60R 1/0617

FOREIGN PATENT DOCUMENTS

DE    3440477 A1    5/1986
DE    19758293 A1    7/1999
(Continued)

OTHER PUBLICATIONS

International Search Report and Written Opinion dated Dec. 3, 2021 of International application No. PCT/EP2021/072711.

*Primary Examiner* — Rodney E Fuller
(74) *Attorney, Agent, or Firm* — Jones Day

(57) ABSTRACT

A camera pod stabilization assembly is provided that includes: an intermediate attachment; wherein the intermediate attachment comprises a first end and a second end, a first protruding member, and a second receiving cavity; a camera arm pivotably coupled to the intermediate attachment at a first end to form a first axis, wherein the camera arm includes a first receiving cavity to receive the first protruding member; and a base pivotably coupled to the intermediate attachment at the second end forms a second axis, wherein the base includes a second protruding member that is received by the second receiving cavity.

14 Claims, 19 Drawing Sheets

(51) Int. Cl.
   *F16M 11/20* (2006.01)
   *F16M 13/02* (2006.01)
   *G03B 17/56* (2021.01)
   *B60R 11/00* (2006.01)

(52) U.S. Cl.
   CPC ......... *F16M 13/022* (2013.01); *G03B 17/561* (2013.01); *B60R 2011/004* (2013.01); *B60R 2011/0085* (2013.01); *B60R 2300/8046* (2013.01)

(56) References Cited

FOREIGN PATENT DOCUMENTS

| | | | | |
|---|---|---|---|---|
| DE | 10022449 | A1 | 11/2001 | |
| DE | 102016209927 | A1 * | 12/2017 | ............... B60R 1/00 |
| EP | 3375665 | A1 | 9/2018 | |
| EP | 3560759 | A1 * | 10/2019 | |
| WO | WO 2020/011923 | A1 | 1/2020 | |
| WO | WO 2020/035317 | A1 | 2/2020 | |

\* cited by examiner

EXTERIOR INSTALLED CAMERA POD STABILIZATION ASSEMBLY

CROSS-REFERENCE TO RELATED APPLICATIONS

This application is a National-Stage Entry of International Patent Application No. PCT/EP2021/072711 filed on Aug. 16, 2021, which claims to benefit of priority to U.S. Provisional Patent Application No. 63/065,596 filed on Aug. 14, 2020, each of which is incorporated by reference in its entirety for all purposes.

BACKGROUND

1. Field

The present disclosure relates to external camera pod stabilization assemblies for a vehicle, and in particular to camera pod stabilization assemblies having bidirectional folding capability.

2. Related Art

Current motor vehicle rear view mirror systems which enable the driver to view indirect fields of view are being replaced by camera systems. In order to monitor the required viewing zones, the camera system must be arranged in a specific layout in regards to frontal position and lateral spacing from the vehicle. This results in the camera pod assembly being of considerable dimension and extension from the side of the vehicle. This creates a larger contact region at risk of being damaged in the event of a collision. Current systems suffer from structural deficiencies that do not advantageously direct the forces to ensure the proper stabilization of the camera pod assemblies.

EP 3375665 discloses a bi-directional folding mechanism for an exterior mounted camera system. The folding mechanism is intended to protect the camera assembly in the event of a collision with the obstacle. The disclosed assembly consists of a first housing to store the camera system and a second housing system that connects to a vehicle. The first housing is pivotally connected to the second housing unit by means of a first pivot connection and a second pivot connection to define a first axis and second axis respectively.

DE 102018116836 B4 discloses a rear-view device for a motor vehicle. The device comprises a first axis and a second axis. Wherein the device is pivotally connected about the first axis to enable rotation in a first direction, and is pivotally connected about the second axis to enable rotation in a second direction. This enables the rear-view device to fold upon impact with an external force, thus reducing damage to the device.

SUMMARY

It is the object of this disclosure to further develop camera pod stabilization assemblies to overcome the problems of the prior art.

The object is achieved by an external camera pod stabilization assembly for a vehicle, and in particular to a camera pod stabilization assembly having bidirectional folding capability.

Embodiments of the present disclosure are described in the sub-claims 2 to 6.

According to one aspect of the present invention, a camera pod stabilization assembly is provided, comprising an intermediate attachment; wherein the intermediate attachment comprises a first end and a second end, a first protruding member, and a second receiving cavity; a camera arm pivotably coupled to the intermediate attachment at a first end to form a first axis wherein the camera arm includes a first receiving cavity to receive the first protruding member; and a base pivotably coupled to the intermediate attachment at the second end forms a second axis, wherein the base includes a second protruding member that is received by the second receiving cavity.

The inventive camera pod stabilization assembly is intended to provide increased stability to a camera pod system. In particular, it serves to reduce any damage the camera pod system may retain upon an impact scenario. The camera pod system is mounted to the exterior of a vehicle and serves as a replacement for rear-view mirror systems. By having bidirectional folding capability, the camera pod system folds upon impact with an external force thus protecting the system. The camera pod stabilization assembly additionally contains an intermediate component which cooperates with an arm of the camera pod assembly and a base which is mounted to the vehicle to transfer forces applied to the camera pod assembly to the vehicle.

According to another aspect of the present invention, provided herein is also a vehicle comprising the inventive camera pod stabilization assembly provided herein.

It should be noted that the features set out individually in the following description can be combined with each other in any technically advantageous manner and set out other forms of the present disclosure. The description further characterizes and specifies the present disclosure in particular in connection with the figures.

DESCRIPTION OF THE DRAWINGS

In order that the disclosure may be well understood, there will now be described various forms thereof, given by way of example, reference being made to the accompanying drawings, in which.

DETAILED DESCRIPTION

Figure 1:
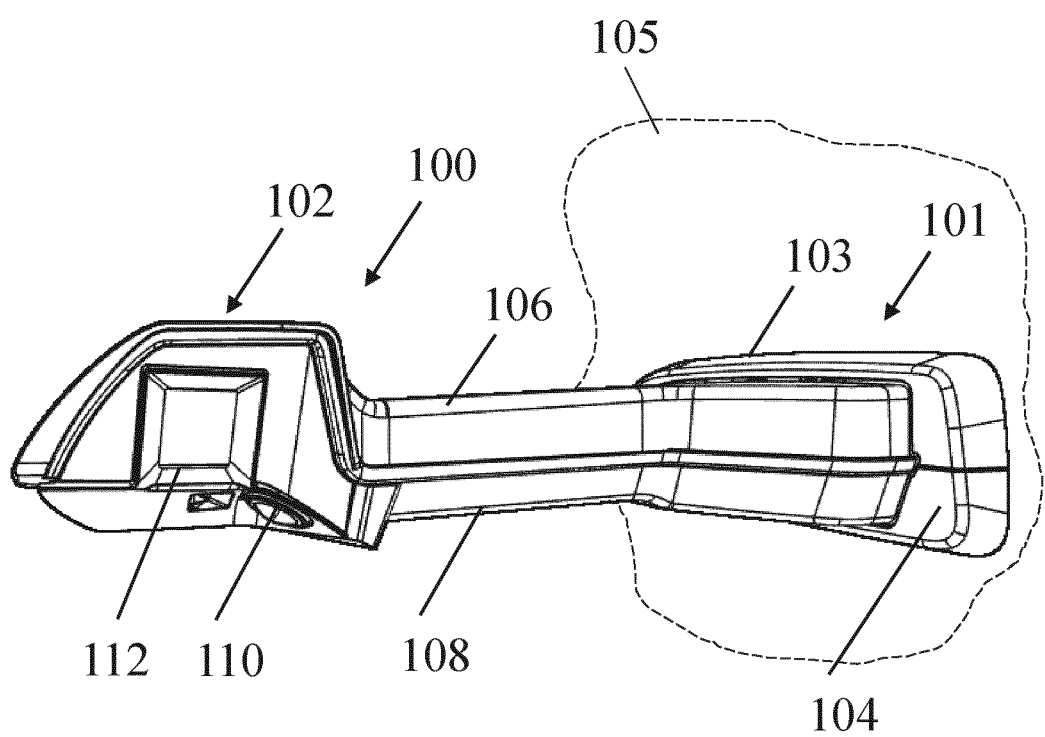
FIG. 1 depicts a front perspective view of the camera pod assembly.

The following description is merely exemplary in nature and is not intended to limit the present disclosure, application, or uses. It should be understood that throughout the drawings, corresponding reference numerals indicate like or corresponding parts and features.

FIG. 1 depicts an external view of a camera pod system (100). The camera pod system (100) is mountable to an exterior of a vehicle (105) at a proximal pod end (101) of the camera pod system (100). At the proximal pod end (101) of the camera pod system (100) an upper base cover (103) and a lower base cover (104) are cooperatively engaged to encase a base (500), shown in FIG. 5. The base (500) mounts to the exterior of the vehicle (105). A top casing (106) and a bottom casing (108) are cooperatively engaged to encase various components of the camera pod system and camera stabilization assembly as depicted in subsequent figures. At a distal pod end (102) of the camera pod system (100), a first camera (110) and a second camera (112) are nested between the top casing (106) and the bottom casing (108). The cameras depicted are exemplary in nature. It is understood that the cameras depicted may be substituted for other sensors or image capturing devices. There may also be more or less cameras, sensors, or image capturing devices then depicted in the disclosed figures.

Figure 2:
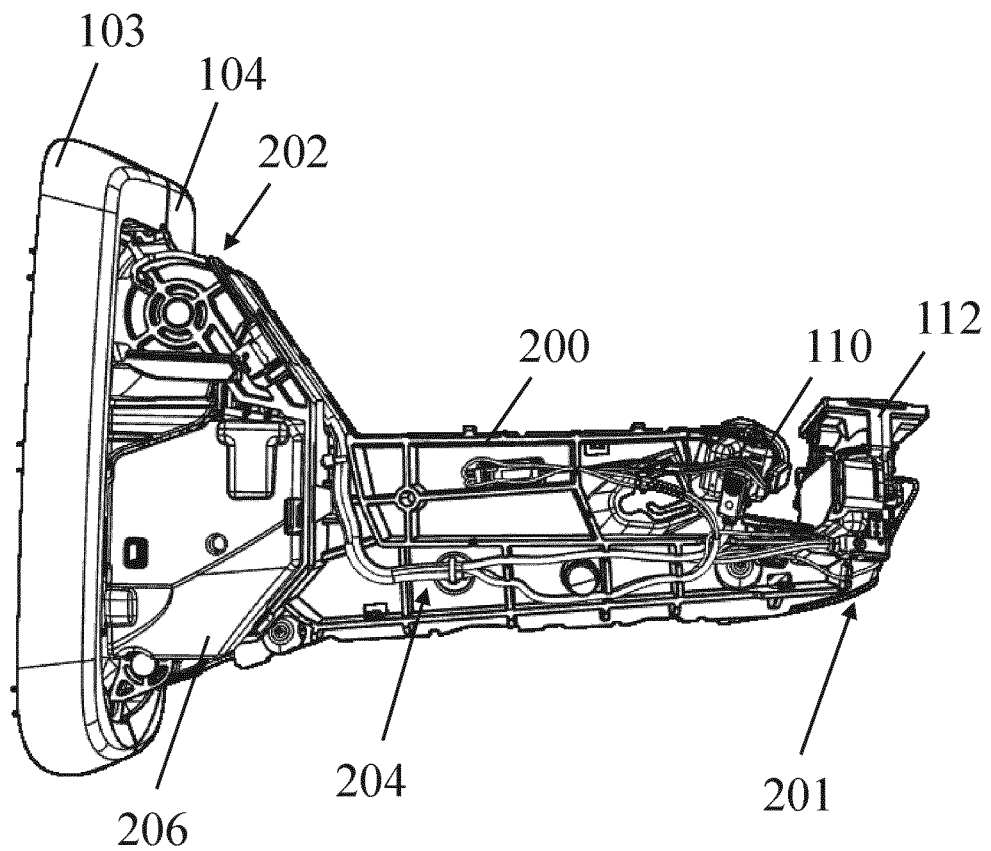
FIG. 2 depicts a top perspective view of the internal components of the camera pod assembly.
Figure 3:
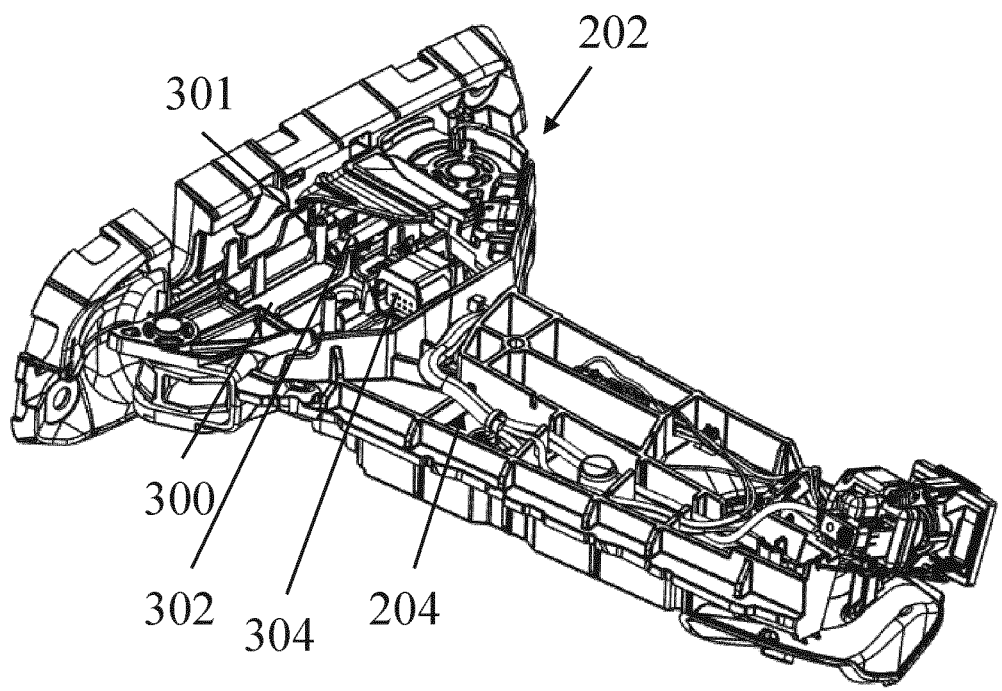
FIG. 3 depicts an isometric view of the internal components of the camera pod assembly.
Figure 4:
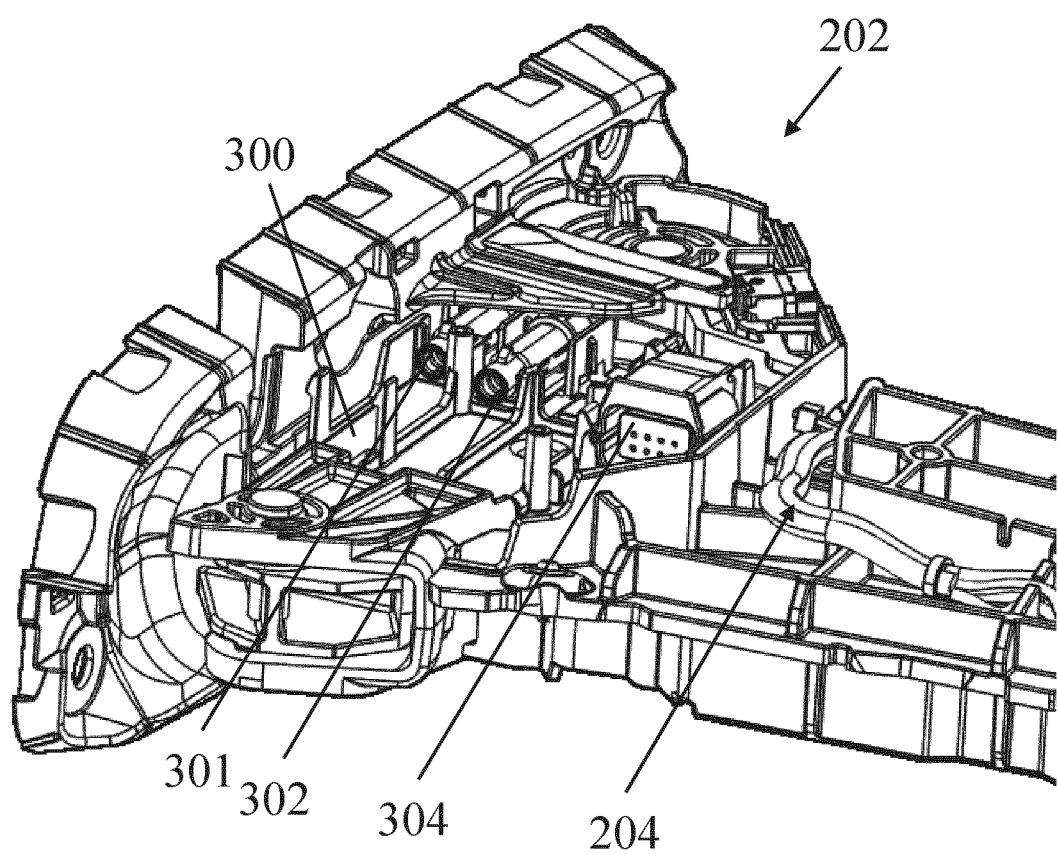
FIG. 4 depicts an enlarged isometric view on the internal components of the camera pod assembly.

FIG. 2, FIG. 3, and FIG. 4 detail the inner components of the camera pod system (100). As shown, the first camera (110) and the second camera (112) are mounted to a camera arm (200) at a distal arm end (201). The first camera (110) and the second camera (112) are connected to a wiring harness (204). The wiring harness (204) is nestled within the camera arm (200) and extends from the distal arm end (201) to a proximal arm end (202). As best illustrated in FIG. 4, the wire harness (204) connects to a first connection terminal (301), a second connection terminal (302), and a third connection terminal (304) at the proximal arm end (202). The connection terminals (301, 302, and 304) are covered by an inner cover (206, FIG. 2) and are attached to a mounting bracket (300), which is fastened to an intermediate attachment (504, FIG. 5) and depicted in subsequent figures. The wire harness (204) provides power to the first camera (110) and the second camera (112), and subsequently can be configured to enable the first camera (110) and the second camera (112) to transmit sensor information, images or readings.

Figure 5:
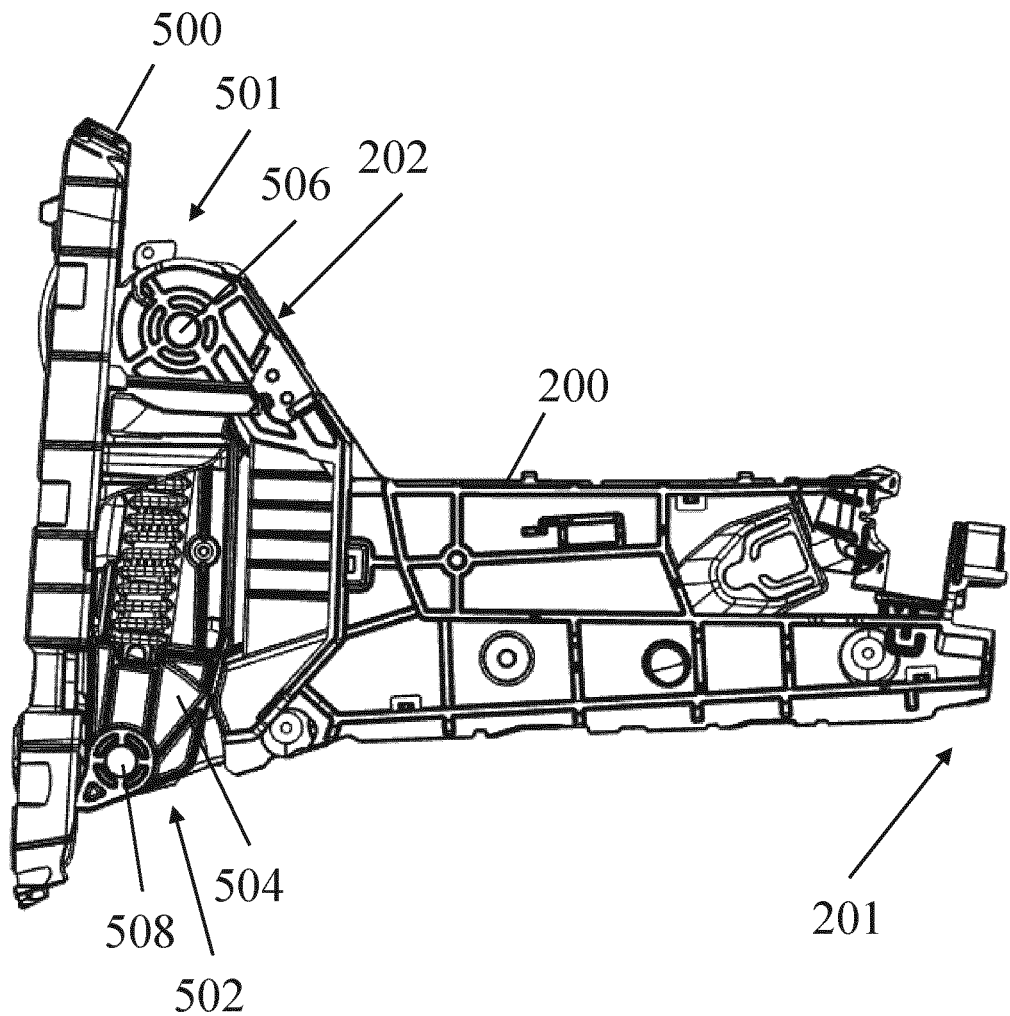
FIG. 5 depicts a top perspective view of the camera pod stabilization assembly.
Figure 7:
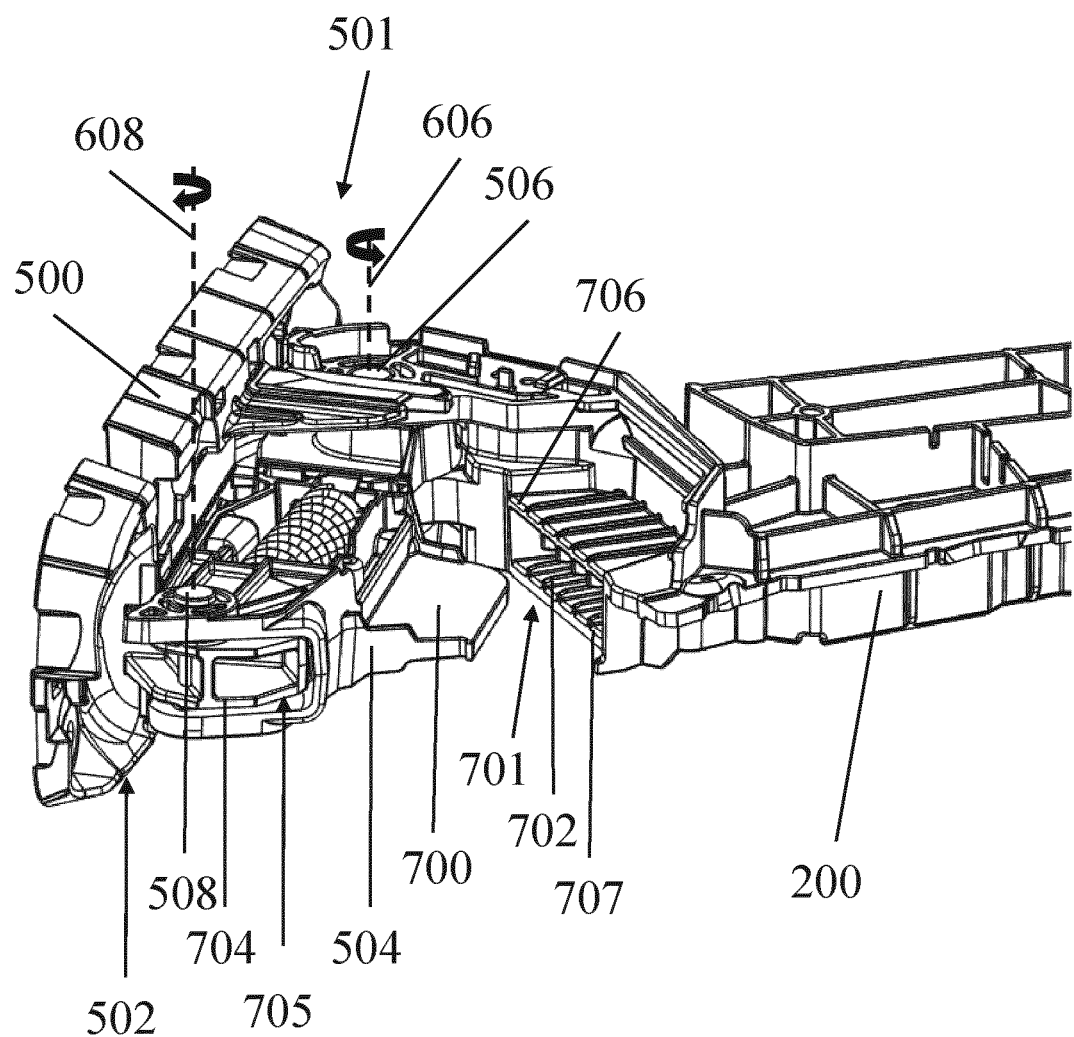
FIG. 7 depicts an isometric view of the camera pod stabilization assembly with a rotation about the first axis.
Figure 8:
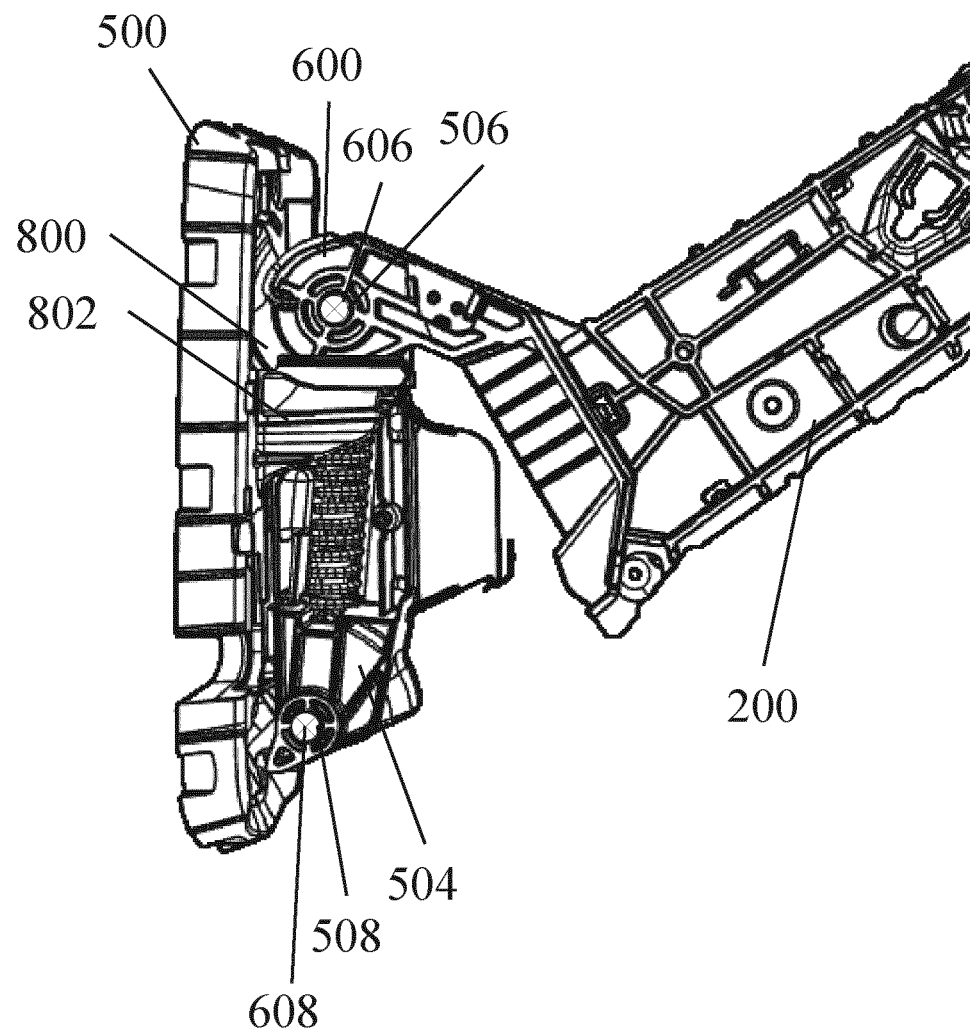
FIG. 8 depicts a top perspective view of the camera pod stabilization assembly with a rotation about the first axis.

FIG. 5 illustrates a top view of the camera pod stabilization assembly in a first position. The proximal arm end (202) of the camera arm (200) is pivotably coupled at a first end (501) of an intermediate attachment (504) via a first pin (506) forming a first axis (606), shown in FIG. 6. As shown in FIG. 5 the camera arm (200) is pivotable about the first axis (606) between zero degrees and 90 degrees, with zero degrees being the first position. FIG. 7 and FIG. 8 illustrate the camera arm (200) pivoting counter-clockwise about the first axis (606) to fold the camera arm (200) forward from the first position to a second position, shown in FIG. 7, and pivoting clockwise to return it to the first position shown in FIG. 5. The second position may be located anywhere between 0 degrees and 90 degrees. The pivot direction is relative and can be altered with respect to the orientation of the camera pod system (100).

Figure 6:
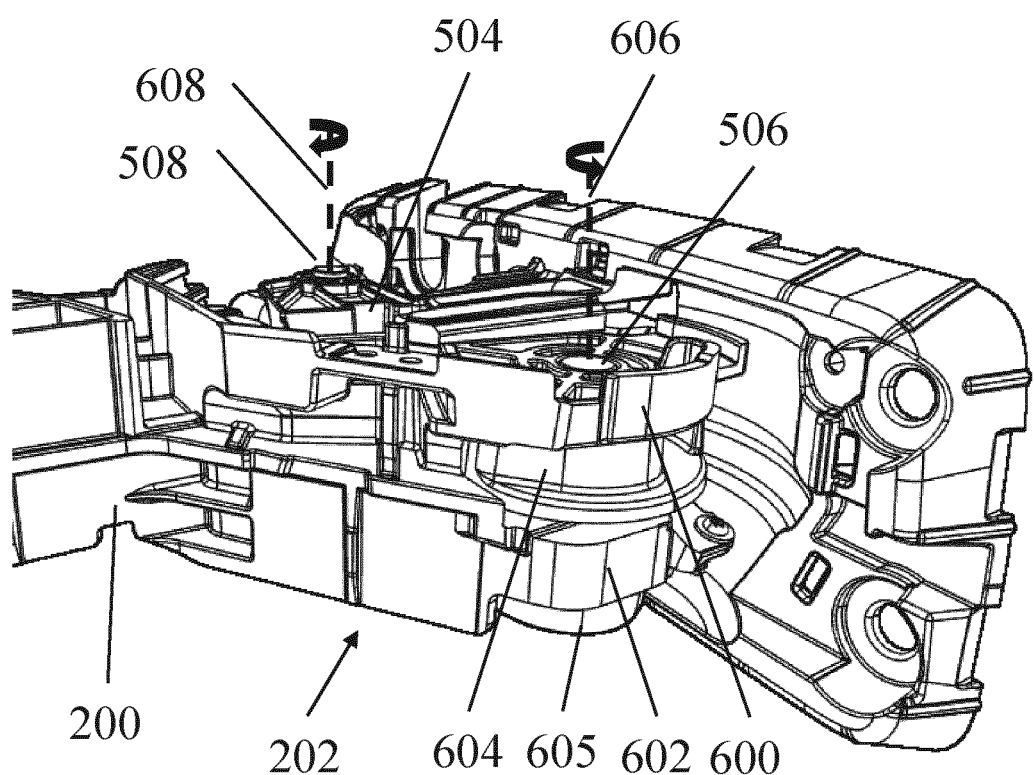
FIG. 6 depicts an isometric view of the camera pod stabilization assembly emphasizing the connection at the first axis.
Figure 9:
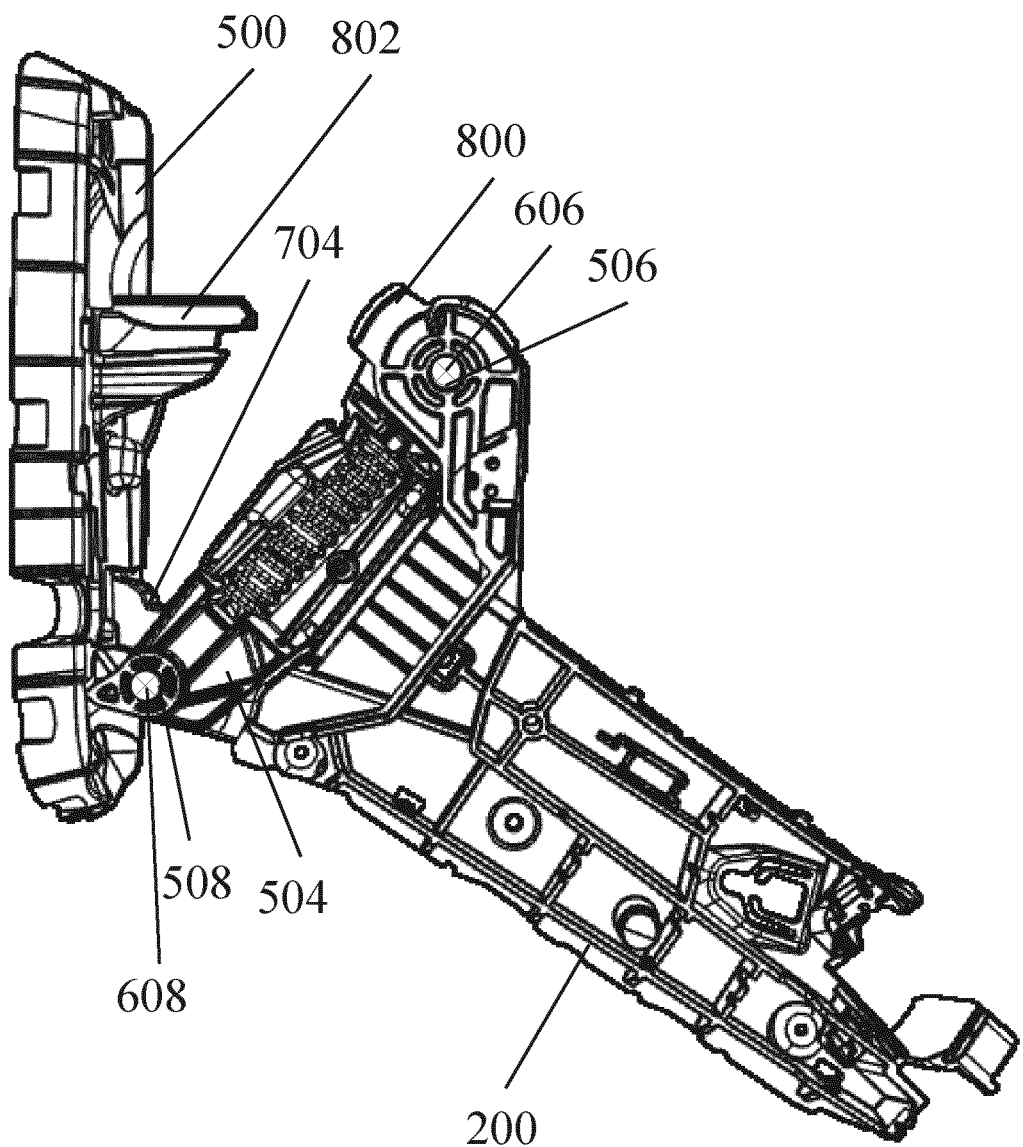
FIG. 9 depicts a top perspective view of the camera pod stabilization assembly with a rotation about the second axis

The intermediate attachment (504) is pivotably coupled to a base (500) at a second end (502) of the intermediate attachment (504) via a second pin (508) to form a second axis (608), shown in FIG. 6. The intermediate attachment (504), along with the coupled camera arm (200), is able to pivot about the second axis (608) between zero degrees and 90 degrees. FIG. 9, illustrates the intermediate attachment (504) pivoting clockwise to fold the camera arm (200) backward from the first position to a third position and pivots counter-clockwise to return the intermediate attachment (504) to the first position as shown in FIG. 5. The third position may be anywhere between 0 degrees and 90 degrees. The pivot direction is relative and can be altered with respect to the orientation of the camera pod system (100). The camera pod system (100) illustrated in this application is configured to be mounted on the left side of a vehicle. However, the present disclosure may be modified to accommodate mounting the camera pod system (100) to the right side or other location on a vehicle.

FIG. 6 depicts an isometric view of the camera pod stabilization assembly emphasizing the connection at the first axis (606). At the proximal arm end (202) of the camera arm (200) there is a first connection member (600) and a second connection member (602). At the first end (501, FIG. 5) of the intermediate attachment (504) there is a first coupling member (604) and a second coupling member (605). The first connection member (600) and second connection member (602) of the camera arm (200) are pivotably connected to the first coupling member (604) and the second coupling member (605) of the intermediate attachment (504) via the first pin (506). In this form, the first coupling member (604) and the second coupling member (605) of the intermediate attachment (504) are operably interleaved with the first connection member (600) and the second connection member (602). The first coupling member (604) of the intermediate attachment (504) is positioned between the first connection member (600) and the second connection member (602) of the camera arm (200). The second connection member (602) of the camera arm (200) then fits between the first coupling member (604) and the second coupling member (605) of the intermediate attachment (504). In other variations, the coupling members (604, 605) and the connection members (600, 602) may be operably coupled in other known configurations to create a pivot joint. The first connection member (600), the second connection member (602), the first coupling member (604), and the second coupling member (605) all contain an aperture (not shown), which when axially aligned enables the insertion of the first pin (506) through all members (600, 602, 604, 605), allowing the camera arm (200) to be pivotably coupled to the intermediate attachment (504) and form the first axis (606).

As illustrated in FIG. 7 and FIG. 8, when the camera arm (200) is rotated in the counter-clockwise direction, it is able to fold forward from the first position to the second position, and returns to the first position when subsequently rotated in the clockwise direction. As illustrated in FIG. 9, the intermediate attachment (504) and the attached camera arm (200) are able to fold backward from the first position to the third position when rotated clockwise about the second axis (608), and are able to return to the first position when subsequently rotated in the counter-clockwise direction. As previously stated, these clockwise and counter-clockwise directions are relative to the orientation of the camera pod system (100) and can be modified to accommodate other mounting configurations.

FIG. 7. illustrates an isometric view of the camera pod stabilization assembly in a forward folded position achieved by rotating the camera arm (200) about the first axis (606). The intermediate attachment (504) includes a first protruding member (700) located between the first end (501) and the second end (502). When the camera arm (200) is in the active position, the first protruding member is received by a first receiving cavity (701) in the camera arm (200). The first receiving cavity contains at least one ribbing member (702). In this form, FIG. 7 depicts five ribbing members (702) located on a top surface (706) and bottom surface (707) that protrude into the first receiving cavity (701). In alternate variations, there may be fewer or more of the ribbing members (702) than depicted. Further, in other variations the ribbing members (702) may extend from the first protruding member (700) rather than from the first receiving cavity (701), or may be located on both the first protruding member (700) and the first receiving cavity (701). When the camera arm (200) is in the first position the first protruding member (700) is received by the first receiving cavity (701). This enables the ribbing members (702) protruding from the inside of the top surface (706) and the bottom surface (707) of the first receiving cavity (701) to engage the first protruding member (700). As the camera pod system (100) encounters vibrations or forces while in the first position, the interaction between the ribbing members (702), first receiving cavity (701), and the first protruding member (700) facilitates the transfer of the vibrations or forces from the camera arm (200) through the intermediate attachment (504), to the base (500). FIG. 7 illustrates the at least one ribbing member (702) in a disengaged position from the first protruding member (700).

Figure 15:
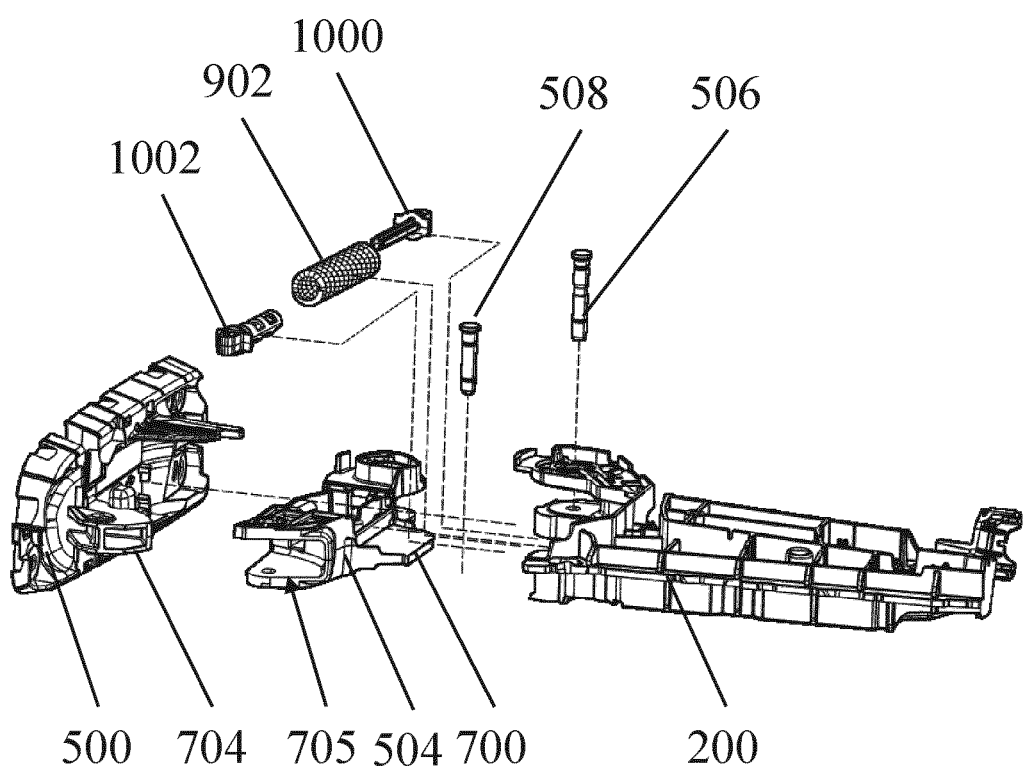
FIG. 15 depicts an exploded view of the camera pod stabilization assembly

The intermediate attachment (504) includes a second receiving cavity (705) located at the second end (502) of the intermediate attachment (504). The second receiving cavity (705) is configured to receive a second protruding member (704) which extends from the base (500). The second receiving cavity (705) and the second protruding member (704) are best illustrated in FIG. 15. The second protruding member (704) and the second receiving cavity (705) contain apertures, which when axially aligned receive the second pin (508), thus pivotably coupling the intermediate attachment (504) to the base (500) and forming the second axis (608). This interaction between the second protruding member (704) and the second receiving cavity (705) enables vibrations and forces from the intermediate attachment (504) to transfer to the base (500), improving the overall stability of the camera pod system (100).

FIG. 8 illustrates a top view of the camera pod stabilization assembly in a forward folded position achieved by rotating the camera arm (200) about the first axis (606). The camera arm includes a bracing member (800) which extends from the first connection member (600). As the camera arm pivots about the first axis (606) the bracing member (800) engages a support surface (802) which extends from the base (500). This connection between the bracing member (800) and the support surface (802) enables downward forces and moments applied to the camera arm (200) to transfer from the camera arm (200) to the base (500).

FIG. 9 depicts a top view of the camera pod stabilization assembly in the third position achieved by rotating the intermediate attachment (504) and attached camera arm (200) about the second axis (608). As forces are applied to the camera arm (200) and/or the intermediate attachment (504), the forces are transferred to the base (500) via the connection at the second axis (608). FIG. 9 also illustrates the disengaged bracing member (800) and the support surface (802) that extends from the base (500).

Figure 10:
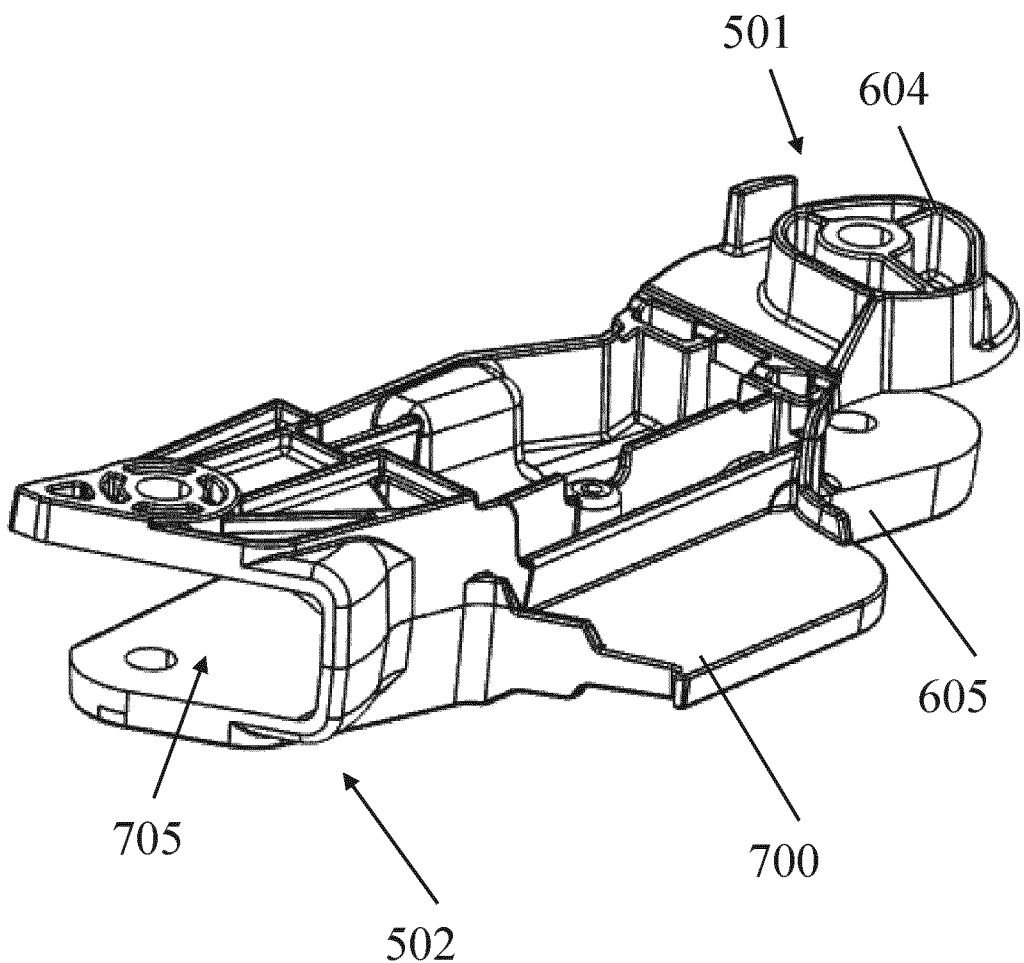
FIG. 10 depicts an isometric view of an intermediate attachment.

FIG. 10 shows the intermediate attachment (504). Specifically, it illustrates the various elements of the intermediate attachment (504) mentioned thus far in the disclosure to provide further clarity. The first coupling member (604) and the second coupling member (605) are located at the first end (501) of the intermediate attachment (504). At the second end (502) of the intermediate attachment (504) is the second receiving cavity (705). Between the first end (501) and the second end (502) of the intermediate attachment (504) is the first protruding member (700).

Figure 11:
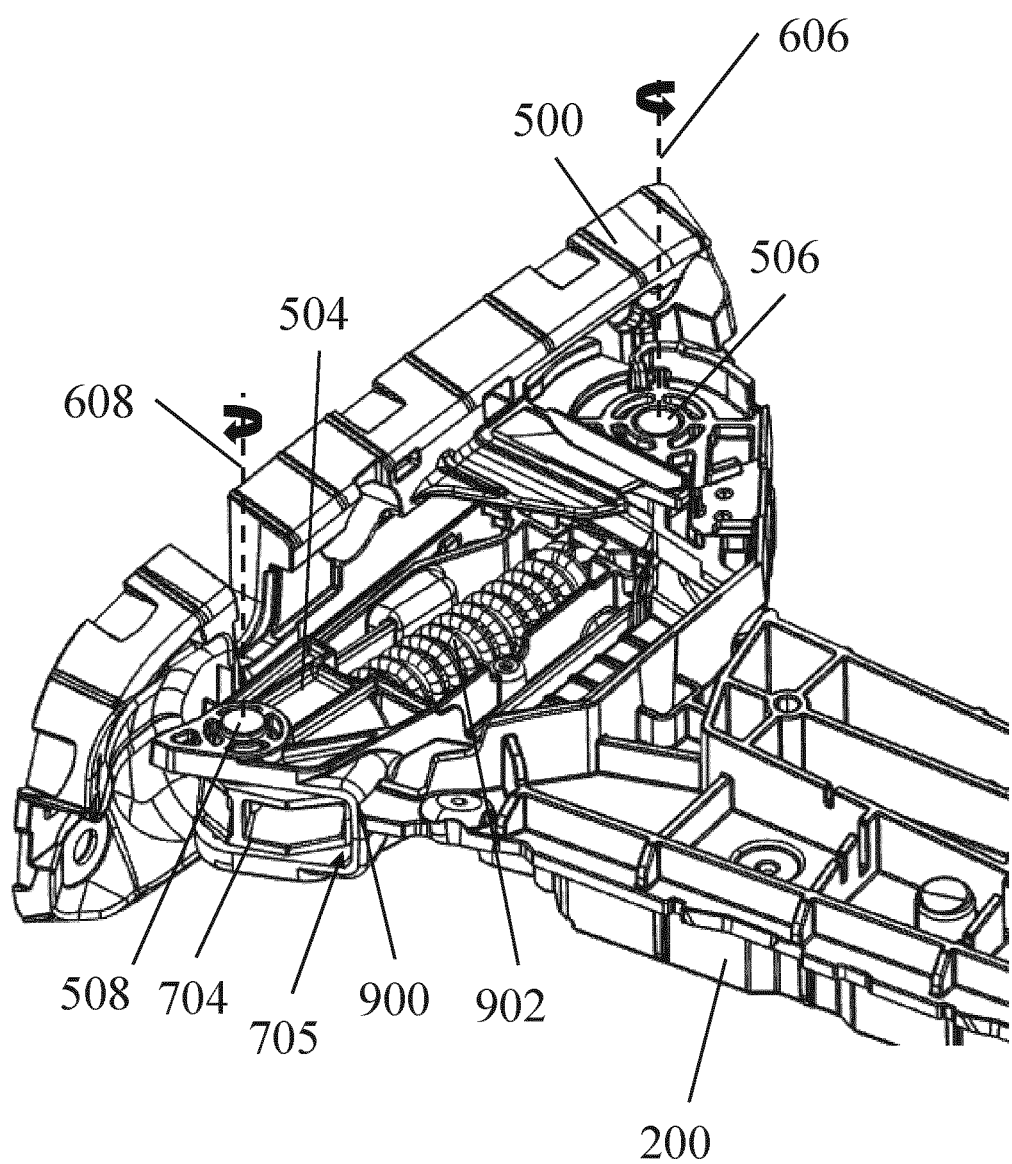
FIG. 11 depicts an isometric view of the camera pod stabilization assembly.
Figure 12:
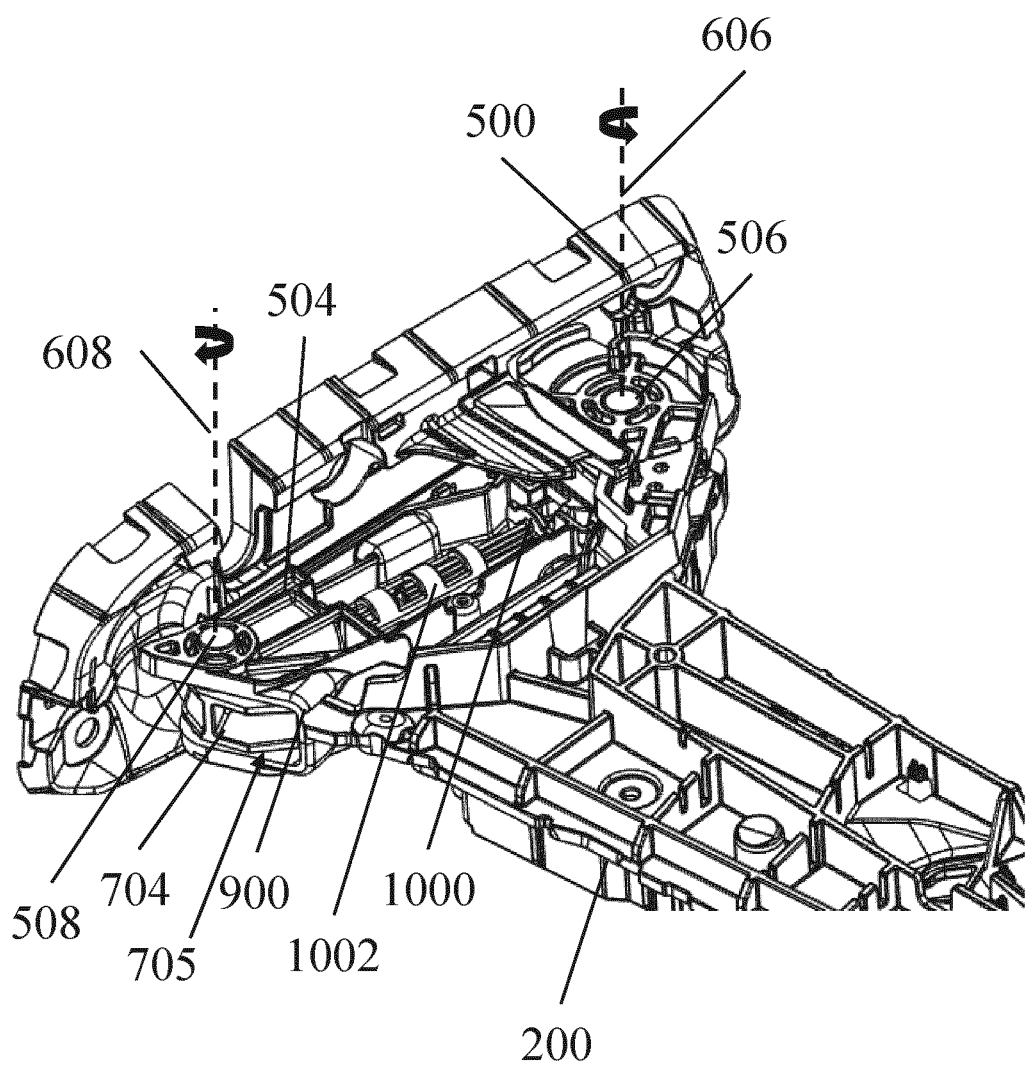
FIG. 12 depicts an isometric view of the camera pod assembly without the biasing element.

FIG. 11 and FIG. 12 depict an isometric view of the camera pod stabilization assembly. In FIG. 11 and FIG. 12 a contact point (900) between the camera arm (200) and the intermediate attachment (504) is shown. The contact point (900) assists in the transfer of vibrations and forces from the camera arm (200) to the intermediate attachment (504) and ultimately the base (500).

Figure 13:
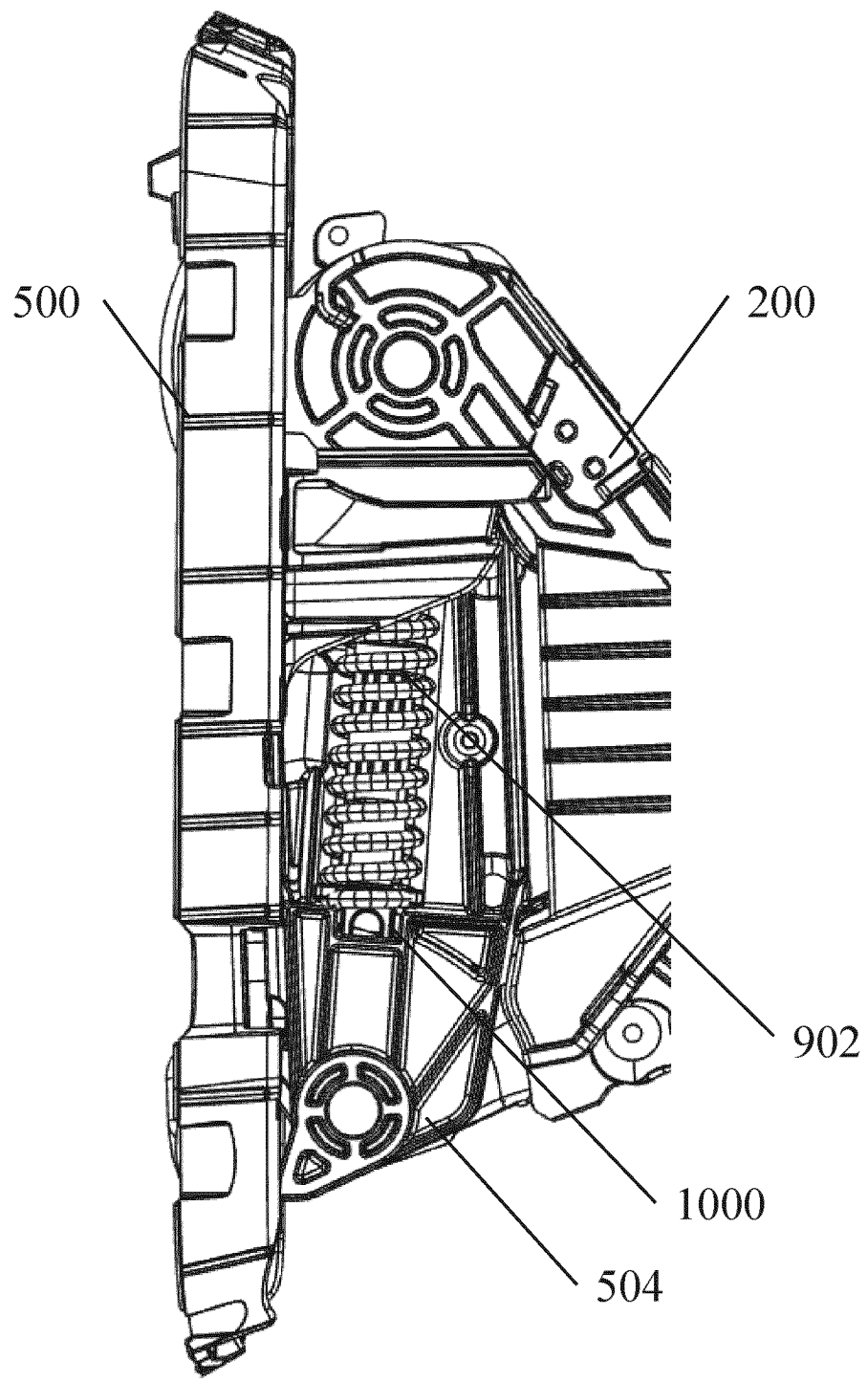
FIG. 13 a top perspective view of the camera pod stabilization assembly emphasizing the biasing element.

FIG. 11 through FIG. 14 further shows a biasing element (902) arranged between the camera arm (200), the base (500), and the intermediate attachment (504). In FIG. 11 the biasing element (902) is depicted as a spring, but could be any biasing element known in the art. The biasing element (902) encases a first biased frame (1000) and a second biased frame (1002), shown in FIG. 12. The first biased frame (1000) is enclosed by the second biased frame (1002), so that the first biased frame (1000) slides within the second biased frame (1002). The first biased frame (1000) and the second biased frame (1002) include shoulder elements that engage either end of the biasing element (902). As seen in FIG. 13, the first biased frame (1000) is held in place by the intermediate attachment (504). In this form, the intermediate attachment (504) includes a cavity to retain a section of the first biased frame (1000) and is situated to ensure the shoulder element of the first biased frame (1000) engages a side wall of the intermediate attachment (504). This ensures the first biased frame (1000) is secured within the intermediate attachment (504). Similarly, the second biased frame (1002) recessed in a cavity of the intermediate attachment (504) and is situated to ensure the shoulder elements of the second biased frame (1002) engages a side wall of the intermediate attachment (504).

Figure 14:
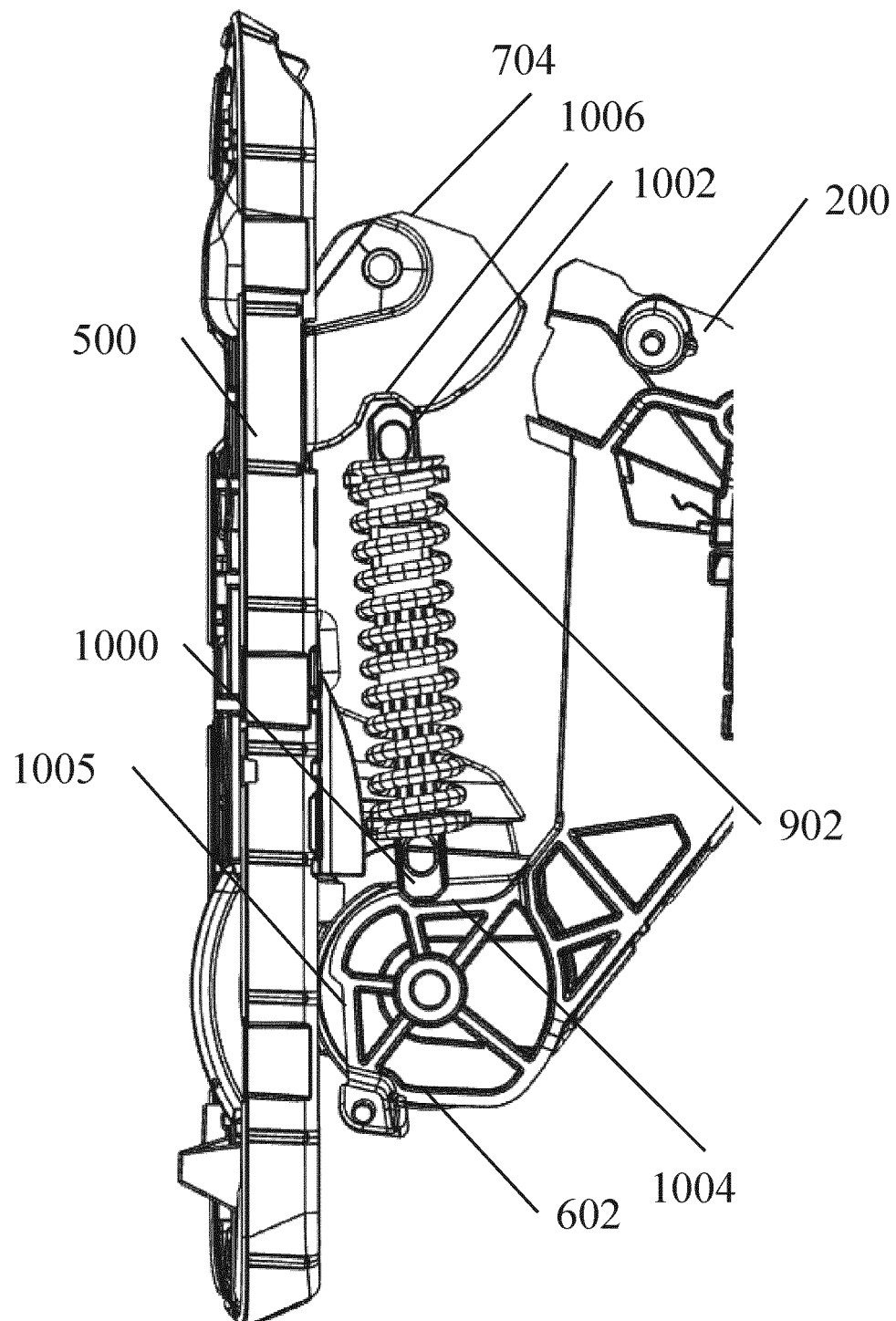
FIG. 14 a bottom perspective view of the biasing element assembly.

The first biased frame (1000) cooperates with a first detent (1004) within the second connection member (602) of the camera arm (200), as seen in the bottom perspective view FIG. 14. The second connection member (602) provides a cam motion. When the camera arm (200) is folded forward to pivot about the first axis (606), the first biased frame (1000) encounters a slope leading to a larger diameter area of the second connection member (602), thus pushing the first biased frame (1000) towards the second biased frame (1002) and compressing the biasing element (902). As the camera arm (200) pivots about the first axis (606) the first biased frame (1000) transitions from the first detent (1004) to a second detent (1005), thus locking it into the forward folded position. Similarly, the second biased frame (1002) cooperates with a third detent (1006) within the second protruding member (704) of the base (500), seen in FIG. 14. When the intermediate attachment (504) is folded backward to pivot about the second axis (608) the second biased frame (1002) encounters a slope leading to a larger diameter area of the second protruding member (704), thus pushing the second biased frame (1002) towards the first biased frame (1000) and compressing the biasing element (902). When the camera arm (200) is returned to the active position the first biased frame (1000) and the second biased frame (1002) move away from each other and allow the biasing element (902) to release the tension it held while in a forward folded or backward folded position respectively.

FIG. 15 shows an exploded view of the camera pod stabilization assembly. This view is intended to show the relationship between the various components within the camera pod stabilization system. As shown, and previously stated, the proximal arm end (202) of the camera arm (200) is pivotably coupled with the intermediate attachment (504) via the first pin (506). The camera arm (200) includes the first receiving cavity (701) (FIG. 7) which cooperates with the first protruding member (700) of the intermediate attachment (504). The base (500) contains the second protruding member (704) which cooperates with the second receiving cavity (705) within the intermediate attachment (504). The second protruding member (704) is pivotably coupled to the second receiving cavity (705) via a second pin (508). The biasing element (902) encases the first biased frame (1000) and the second biased frame (1002). The biasing element (902), the first biased frame (1000) and the second biased frame (1002) are then nestled between the camera arm (200), the base (500), and the intermediate attachment (504).

Figure 16:
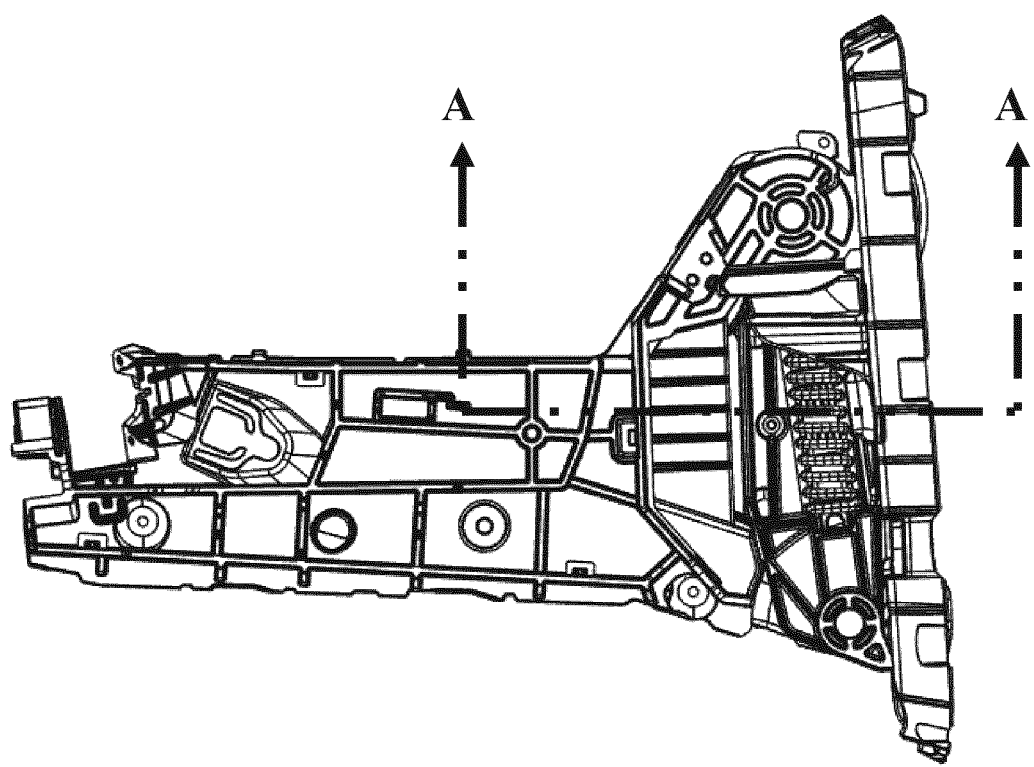
FIG. 16(a) is a top perspective view of the camera pod stabilization assembly showing a location of the first section view
FIG. 16(b) is a first section view depicting the fitting between a first protruding member and a first receiving cavity.
Figure 16:
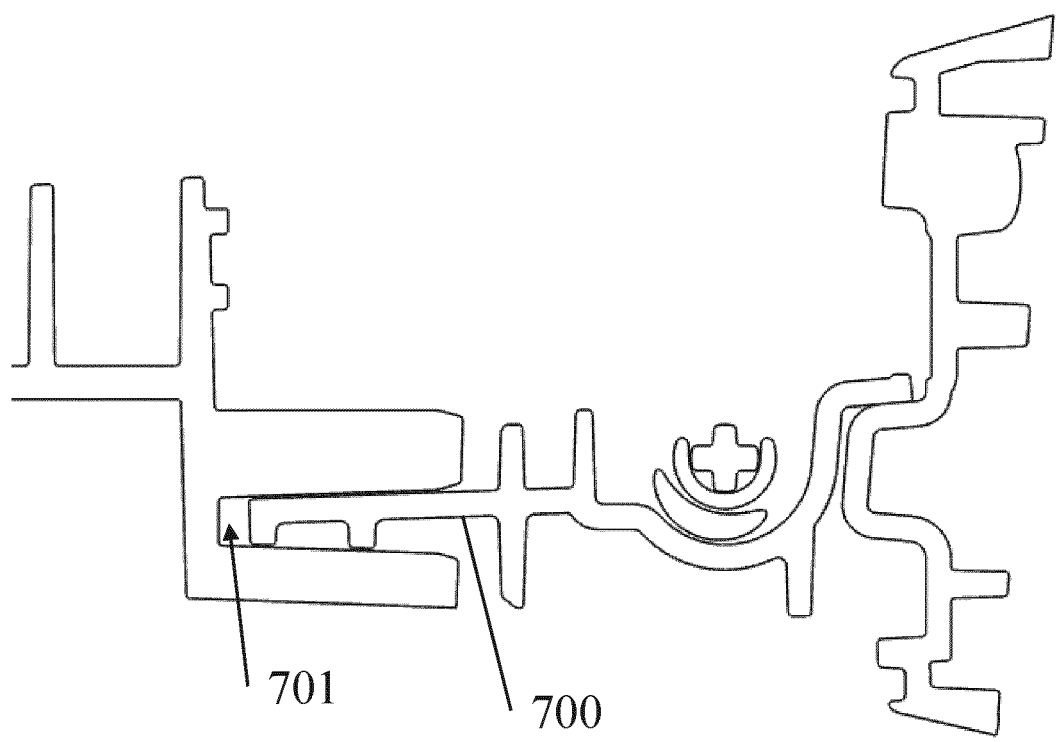

FIG. 16(a) illustrates the location of the section view depicted in FIG. 16(b). The section line is cut through a ribbing member (702). The section view in FIG. 16(b) shows a sectional view of the fitting between the first protruding member (700) of the intermediate attachment (504, FIG. 7) and the first receiving cavity (701) of the camera arm (200, FIG. 7). This view is to clarify the relationship between the first protruding member (700) and the first receiving cavity (701) which allows for a transfer of forces between the first protruding member (700) and the ribbing member (702, FIG. 7) in the first receiving cavity (701).

Figure 17:
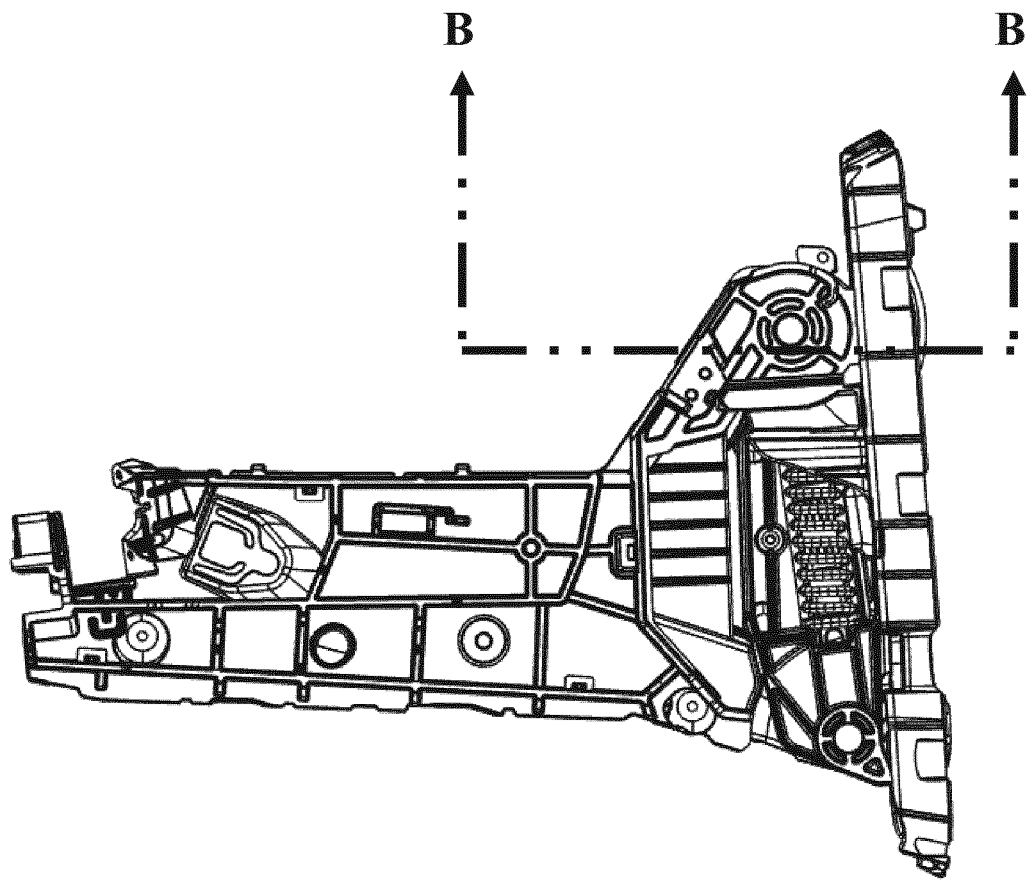
FIG. 17(a) is a top perspective view of the camera pod stabilization assembly showing the location of a second section view.
FIG. 17(b) is a second section view depicting the fitting between a second protruding member and a second receiving cavity.
Figure 17:
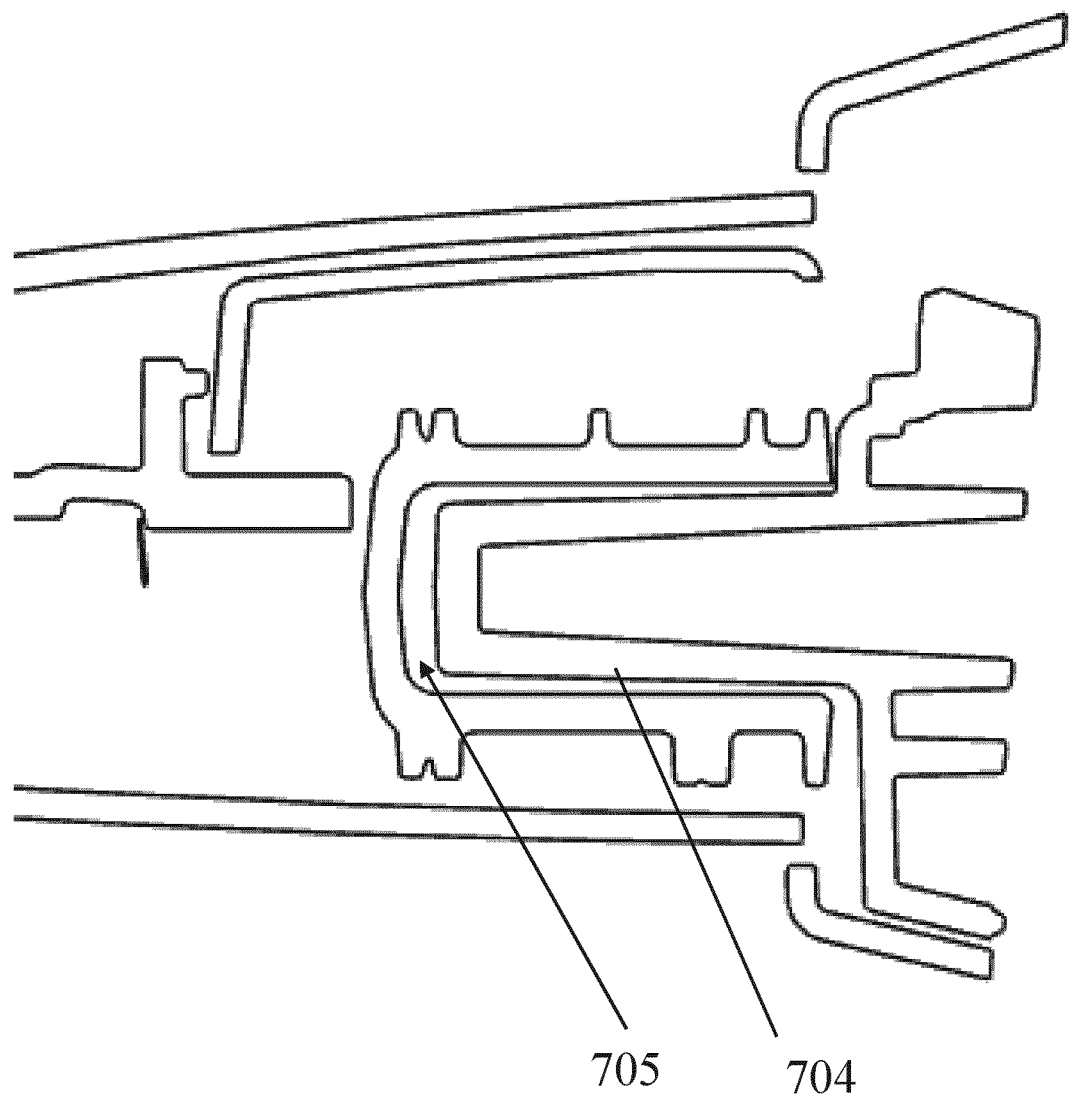

FIG. 17(a) illustrates the location of the section view depicted in FIG. 17(b). The section view in FIG. 17(b) shows a sectional view of the fitting between the second protruding member (704) of the base (500, FIG. 15) and the second receiving cavity (705) of the intermediate attachment (504, FIG. 15). This view is to clarify the relationship between the second protruding member (704) and the second receiving cavity (705).

The foregoing description of various preferred forms have been presented for purposes of illustration and description. It is not intended to be exhaustive or to limit the disclosure to the precise forms disclosed, and obviously many modifications and variations are possible in light of the above teaching. The example variations, as described above, were chosen and described in order to best explain the principles of the disclosure and its practical application to thereby enable others skilled in the art to best utilize the disclosure in various forms and with various modifications as are suited to the particular use contemplated. The features disclosed in the foregoing description, in the drawings and in the claims can be essential both individually and in any combination for the implementation of the disclosure in its various forms and embodiments.

REFERENCE SIGN LIST

100—Camera Pod System
101—Proximal Pod End
102—Distal Pod End
103—Upper Base Cover
104—Lower Base Cover
105—Vehicle
106—Top Casing
108—Bottom Casing
110—First Camera
112—Second Camera
200—Camera Arm
201—Distal Arm End
202—Proximal Arm End
204—Wire Harness
206—Inner Cover
300—Mounting Bracket
301—First Connection Terminal
302—Second Connection Terminal
304—Third Connection Terminal
500—Base
501—First End
502—Second End
504—Intermediate Attachment
506—First Pin
508—Second Pin
600—First Connection Member
602—Second Connection Member
604—First Coupling Member
605—Second Coupling Member
606—First Axis
608—Second Axis
700—First Protruding Member
701—First Receiving Cavity
702—Ribbing Member
704—Second Protruding Member
705—Second Receiving Cavity
706—Top Surface
707—Bottom Surface
800—Bracing Member
802—Support Surface
900—Contact Point
902—Biasing Element
1000—First Biased Member
1002—Second Biased Member
1004—First Detent
1005—Second Detent
1006—Third Detent

The invention claimed is:

1. A camera pod stabilization assembly, comprising:
an intermediate attachment, wherein the intermediate attachment comprises a first end and a second end;
a camera arm, wherein the camera arm is pivotably coupled to the intermediate attachment at the first end via a first pin to form a first axis; and
a base, wherein the base is pivotably coupled to the intermediate attachment at the second end via a second pin to form a second axis,
wherein the camera arm includes a first receiving cavity to receive a first protruding member.

2. The camera pod stabilization assembly of claim 1, wherein the intermediate attachment comprises the first protruding member and a second receiving cavity.

3. The camera pod stabilization assembly of claim 2, wherein the base includes a second protruding member that is received by the second receiving cavity to transfer vibrations and forces to the base via the connection at the second axis.

4. The camera pod stabilization assembly of claim 3, wherein the second protruding member of the base is pivotably coupled to the second receiving cavity of the intermediate attachment.

5. The camera pod stabilization assembly of claim 3, wherein the second protruding member and the second receiving cavity contain apertures, which when axially aligned receive the second pin.

6. The camera pod stabilization assembly of claim 3, further comprising:
a biasing element that encases a first biased member and a second biased member, wherein the first biased member and second biased member cooperate between the second protruding member and the camera arm.

7. The camera pod stabilization assembly of claim 6, wherein the intermediate attachment includes a cavity to retain a section of the first biased frame and is situated to ensure a shoulder element of the first biased frame engages a side wall of the intermediate attachment.

8. The camera pod stabilization assembly of claim 6, wherein the second biased frame is recessed in a cavity of the intermediate attachment and is situated to ensure a shoulder element of the second biased frame engages a side wall of the intermediate attachment.

9. The camera pod stabilization assembly of claim 6, wherein a support surface extends from the base, a bracing member extends from the first end of the intermediate attachment, and the support surface and the bracing member cooperate and engage to assist in a transfer of forces from the camera arm to the base when the camera arm is rotated about the first axis from a first position to a second position.

10. The camera pod stabilization assembly of claim 1, further comprising:
a first connection member and a second connection member at the proximal arm end of the camera arm that is pivotably connected to a first coupling member and a second coupling member at the intermediate attachment.

11. The camera pod stabilization assembly of claim 1, wherein at least one of:
(a) the camera arm is pivotable about the first axis from a first to a second position between zero degrees and 90 degrees, and
(b) the camera arm is pivotable about the second axis from a first to a third position between zero degrees and 90 degrees.

12. A vehicle comprising the camera pod stabilization assembly of claim 1.

13. A camera pod stabilization assembly, comprising:
an intermediate attachment, wherein the intermediate attachment comprises a first end and a second end;
a camera arm, wherein the camera arm is pivotably coupled to the intermediate attachment at the first end via a first pin to form a first axis; and
a base, wherein the base is pivotably coupled to the intermediate attachment at the second end via a second pin to form a second axis,
wherein the camera arm includes a first receiving cavity to receive a first protruding member,
wherein the first receiving cavity comprises at least one ribbing member engaging the first protruding member when in a first position to facilitate the transfer of the vibrations or forces from the camera arm through the intermediate attachment to the base.

14. The camera pod stabilization assembly of claim 13, wherein the at least one ribbing member disengages from the first protruding member when the camera arm is rotated about the first axis from the first position to a second position.

* * * * *